(12) United States Patent
Kim et al.

(10) Patent No.: US 12,091,363 B2
(45) Date of Patent: Sep. 17, 2024

(54) METHOD FOR FORMING HIGH HEAT-RESISTANT COATING FILM USING LIQUID CERAMIC COMPOSITION AND HIGH HEAT-RESISTANT COATING FILM PREPARED THEREBY

(71) Applicant: KOREA INSTITUTE OF SCIENCE AND TECHNOLOGY, Seoul (KR)

(72) Inventors: Sang Woo Kim, Seoul (KR); Jun Ho Lim, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 404 days.

(21) Appl. No.: 17/396,186

(22) Filed: Aug. 6, 2021

(65) Prior Publication Data

US 2022/0064070 A1    Mar. 3, 2022

(30) Foreign Application Priority Data

Aug. 28, 2020 (KR) .................. 10-2020-0109540
Jul. 1, 2021 (KR) .................. 10-2021-0086251

(51) Int. Cl.
*C04B 35/16* (2006.01)
*C04B 35/622* (2006.01)
(Continued)

(52) U.S. Cl.
CPC ........ *C04B 35/16* (2013.01); *C04B 35/62222* (2013.01); *C04B 35/624* (2013.01); *C04B 35/6261* (2013.01); *C04B 35/6264* (2013.01); *C04B 35/64* (2013.01); *C04B 2235/3217* (2013.01); *C04B 2235/3236* (2013.01); *C04B 2235/3244* (2013.01); *C04B 2235/3272* (2013.01); *C04B 2235/3427* (2013.01); *C04B 2235/3826* (2013.01); *C04B 2235/442* (2013.01); *C04B 2235/483* (2013.01);
(Continued)

(58) Field of Classification Search
None
See application file for complete search history.

(56) References Cited

U.S. PATENT DOCUMENTS

2002/0010273 A1* 1/2002 Matsumura .......... C09D 143/04
525/100

FOREIGN PATENT DOCUMENTS

CN     101970723 A  *  2/2011  ......... C23C 18/1216
JP     4216037 B2   *  1/2009
(Continued)

OTHER PUBLICATIONS

CN-101970723-A Eng trans (Year: 2011).*
JP 4216037 B2 eng trans (Year: 2009).*

*Primary Examiner* — Jeffrey D Washville
(74) *Attorney, Agent, or Firm* — Rabin & Berdo, P.C.

(57) ABSTRACT

The present invention relates to a high heat-resistant/oxidation-resistant/flame retardant-non-flammable liquid ceramic coating film for protecting an exterior of an apparatus in an extreme environment. Provided are a method of forming a high heat-resistant coating film including: (a) preparing a liquid ceramic filling agent by mixing a ceramic filler including iron (III) oxide ($Fe_3O_4$) powder, a diluent, and an inorganic nanosol; (b) applying the liquid ceramic filling agent to at least one surface of a substrate to form a coating film; and (c) curing the coating film by drying the substrate, and a high heat-resistant coating film prepared thereby.

30 Claims, 15 Drawing Sheets

(51) Int. Cl.
    *C04B 35/624* (2006.01)
    *C04B 35/626* (2006.01)
    *C04B 35/64* (2006.01)
(52) U.S. Cl.
    CPC ............ *C04B 2235/5436* (2013.01); *C04B 2235/5445* (2013.01); *C04B 2235/5454* (2013.01); *C04B 2235/6567* (2013.01); *C04B 2235/9669* (2013.01)

(56) References Cited

FOREIGN PATENT DOCUMENTS

| | | |
|---|---|---|
| KR | 1020190004927 A | 1/2019 |
| KR | 10-2020-0054671 A | 5/2020 |

\* cited by examiner

FIG. 2

| | AZS-1 (a) | AZS-1 (F) (b) | ZB (c) | ZB (F) (d) | ZB-3 (R.T) (e) | ZB-3 (100) (f) | ZB-3 (150) (g) |
|---|---|---|---|---|---|---|---|
| Al | | | | | | | |
| Fe | | | | | | | |

FIG. 5

| BEFORE | ORIGINAL PLATE (a) | AZS-1 (b) | ZB (c) |
|---|---|---|---|
| Al | | | |
| Fe | | | |
| AFTER | ORIGINAL PLATE (a) | AZS-1 (b) | ZB (c) |
| Al | | | |
| Fe | | | |

FIG. 7

| BEFORE | ZB-2(R.T) | ZB-2(100) | ZB-2(150) |
|---|---|---|---|
| Al | | | |
| Fe | | | |
| AFTER | ZB-2(R.T) | ZB-2(100) | ZB-2(150) |
| Al | | | |
| Fe | | | |

FIG. 8

| BEFORE | ZB-3(R.T) | ZB-3(100) | ZB-3(150) |
|---|---|---|---|
| Al | | | |
| Fe | | | |
| AFTER | ZB-3(R.T) | ZB-3(100) | ZB-3(150) |
| Al | | | |
| Fe | | | |

FIG. 9

| BEFORE | ZB-4(R.T) | ZB-4(100) | ZB-4(150) |
|--------|-----------|-----------|-----------|
| Al     |           |           |           |
| Fe     |           |           |           |

| AFTER  | ZB-4(R.T) | ZB-4(100) | ZB-4(150) |
|--------|-----------|-----------|-----------|
| Al     |           |           |           |
| Fe     |           |           |           |

FIG. 10

| BEFORE | ZB-4(R.T) | ZB-4(100) | ZB-4(150) |
|---|---|---|---|
| Al | | | |
| Fe | | | |

| AFTER | ZB-4(R.T) | ZB-4(100) | ZB-4(150) |
|---|---|---|---|
| Al | | | |
| Fe | | | |

FIG. 13A

| | ORIGINAL PLATE | STEEL SHEET COATED WITH INORGANIC NANOSOL | ZB-1 | ZB-2 | ZB-3 | ZB-4 | ZB-5 |
|---|---|---|---|---|---|---|---|
| Fe | | | | | | | |

FIG. 13B

| | ZB-3 Hydrophobic coating |
|---|---|
| Fe | |

METHOD FOR FORMING HIGH HEAT-RESISTANT COATING FILM USING LIQUID CERAMIC COMPOSITION AND HIGH HEAT-RESISTANT COATING FILM PREPARED THEREBY

CROSS-REFERENCE TO RELATED APPLICATION

This application claims the benefit of Korean Patent Application Nos. 10-2020-0109540, filed on Aug. 28, 2020 and 10-2021-0086251, filed on Jul. 1, 2021, in the Korean Intellectual Property Office, the disclosures of which are incorporated herein in its entirety by reference.

BACKGROUND

1. Field

The present invention relates to a method of forming a high heat-resistant coating film using a liquid ceramic composition capable of forming a flame retardant/non-flammable coating film with excellent heat resistance and oxidation resistance in a high temperature environment and a high heat-resistant coating film prepared thereby.

2. Description of the Related Art

Ceramic coating films are formed on surfaces of metallic, wooden, fibrous, and plastic materials to improve resistance thereof to corrosion, heat, abrasion, and the like. Coating agents for forming the ceramic coating films may be prepared in the form of liquid ceramic compositions. Such a liquid ceramic coating agent is prepared by adding a functional filler material suitable for each purpose to a thermoplastic or thermosetting polymer resin dissolved in a solvent in order to improve functions or extend a lifespan of a substrate material. Coating agents composed of general thermoplastic or thermosetting polymer resins are normally used at a temperature below 200° C. due to low melting points thereof. Polyetheretherketone (PEEK) polymer, as a representative heat-resistant polymer having a melting point of 343° C., has durability at a high temperature up to 260° C. but has been widely used for injecting molding or extrusion molding in which PEEK is used in a melted state. Since PEEK is not easily soluble in solvents, it is not suitable for a liquid resin for coating. Thus, a coating film may be manufactured by coating a dispersion prepared by dispersing PEEK powder in a dispersion medium on a substrate by powder coating and melting the coated powder at a high temperature of 400° C. higher than the melting point. Polyimide (PI), another heat-resistant polymer coating agent, may be used to form a heat-resistant coating film that may be used at a high temperature of 300° C. to 350° C., by coating a polyamic acid (PAA), as a precursor solution of PI, on a substrate and heat-treating the coated PAA in a vacuum atmosphere at about 350° C. In extreme environments requiring high heat resistance or non-flammability, resistance capable of withstanding heat at 500° C. or higher is required and thus it is practically impossible to use the above-described heat-resistant polymer materials.

Among coating materials having high heat resistance, metal is easily oxidized and thus not suitable for use in a high-temperature oxidizing atmosphere. As a coating material suitable therefor, a ceramic material may be used, and an inorganic paint such a ceramic material may be used to form a heat-resistant coating film. Particularly, application of heat-resistant inorganic paints to inner/outer surfaces of industrial apparatuses used at high temperature is essential for creation of high added values and development of wide ranges of uses via functionalization of products. Development of a high heat-resistant paint capable of providing not only heat resistance but also high functionality such as excellent adhesive strength and chemical resistance to a metallic or non-metallic product requiring high heat-resistance by converting the surface of the product into a ceramic surface, is important to extend the lifespan of a product and provide functionality to the product.

As a preparation method for coating such a ceramic coating agent onto a substrate, a drying coating method using a vacuum apparatus or a plasma spray coating apparatus has widely been used. Although excellent physical properties may be obtained by the dry coating method, the apparatus is expensive, manufacturing costs increase thereby, and the method is disadvantageous to be applied to a large area. According to a wet coating method enabling large area application with lower costs, a coating film is prepared by dissolving a heat-resistant ceramic powder in a polymer resin, coating the melted powder, removing the polymer resin at a first high temperature, and firing the resultant at a second high temperature for sintering. However, this wet coating method has been applied to coating for small-sized electronic components rather than large-area coating due to difficulty of firing the ceramic filler at a high temperature to a sintering temperature and necessity of a large-sized sintering furnace for the large-area coating. A ceramic sol coating method has been proposed to decrease a firing temperature of the wet ceramic coating method. A ceramic sol for high temperature has been mainly used in coating for thin films since a firing temperature may be decreased below 500° C. when a very thin film is formed. However, the ceramic sol is not suitable for painting due to expensive sol precursors and limitation in thickness.

Since use of the liquid ceramic coating agent not fired at high temperature causes problems such as deterioration of physical properties of a coating film and scratches and peeling off of coated surfaces, it is difficult to apply the liquid ceramic coating agent in an inexpensive and easy way similar to that for a paint. Therefore, the liquid ceramic coating agent has been limitedly used in small-sized products or certain products as a specified coating agent.

SUMMARY

An object of the present invention is to provide a nanocomposite ceramic coating agent for low-temperature firing which is fired at a low temperature to solve problems of peeling off or destruction of a coating film conventionally caused in high-temperature firing of a liquid ceramic coating agent and a coating method therefor. Thus, a flame retardant/non-flammable coating agent having high heat-resistance may be easily formed on various large-area substrates without high-temperature firing.

Additional aspects will be set forth in part in the description which follows and, in part, will be apparent from the description, or may be learned by practice of the presented embodiments.

An aspect of the present invention to achieve the above-described object provides a method of forming a high heat-resistant coating film, the method including: (a) preparing a liquid ceramic filling agent by mixing a ceramic filler including iron (III) oxide ($Fe_3O_4$) powder, a diluent, and an inorganic nanosol; (b) applying the liquid ceramic filling agent to at least one surface of a substrate; and (c) drying and curing the substrate to form a coating film.

In an embodiment, the liquid ceramic filling agent may be prepared by mixing 10 wt % to 50 wt % of the ceramic filler, 10 wt % to 30 wt % of the diluent, and 20 wt % to 80 wt % of the inorganic nanosol.

In an embodiment, a content of the iron (III) oxide ($Fe_3O_4$) may be from 20 wt % to 60 wt % based on a content of the ceramic filler.

In an embodiment, the content of the iron (III) oxide ($Fe_3O_4$) may be from 30 wt % to 50 wt % based on the content of the ceramic filler.

In an embodiment, the step (a) may be performed by simultaneously mixing the ceramic filler, the diluent, and the inorganic nanosol or by adding the inorganic nanosol to a mixed solution of the ceramic filler and the diluent, followed by mixing.

In an embodiment, the ceramic filler may include one selected from the group consisting of barium titanate ($BaTiO_3$), alumina ($Al_2O_3$), zirconia ($ZrO_2$), silicon carbide (SiC), pearl, and any mixture thereof in the form of powder.

In an embodiment, the ceramic filler may have a particle size of 10 nm to 2500 nm.

In an embodiment, the liquid ceramic filling agent may be mixed by a ball mill process.

In an embodiment, the diluent may be distilled water or alcohol.

In an embodiment, the alcohol may be isopropanol (IPA) or n-butanol.

In an embodiment, the inorganic nanosol may be silica sol or silica-hybrid sol.

In an embodiment, the step (b) may be performed by one method selected from the group consisting of brush coating, spin coating, spray coating, and dip coating.

In an embodiment, the inorganic nanosol may be obtained by adding a solvent to an alkoxysilane and stirring the mixture, and the alkoxysilane is one selected from the group consisting of methyltrimethoxysilane, methyltrichlorosilane, ethyltrimethoxysilane, ethyltriethoxysilane, phenyltrimethoxysilane, phenyltrichlorosilane, phenylaminopropyltrimethoxysilane, octyltrimethoxysilane, octyltrichlorosilane, octadecyltrimethoxysilane, octadecyltrichlorosilane, propyltrimethoxysilane, n-propyltriethoxysilane, isopropyltriethoxysilane, isobutyltrimethoxysilane, vinyltriethyloxysilane, vinyltrimethoxysilane, and allyltrimethoxysilane.

In an embodiment, the step (c) may be performed at a temperature of 20° C. to 200° C. for 2 hours to 24 hours.

In an embodiment, the method may further include removing impurities remaining on the surface of the substrate after the step (c).

In an embodiment, the substrate may be formed of aluminum, a steel sheet, titanium, copper, or a stainless-steel alloy.

In an embodiment, the method may further include surface-treating the substrate before the step (b).

Provided is a high heat-resistant coating film prepared by the method, wherein the high heat-resistant coating film is formed on at least one surface of a substrate and includes iron (III) oxide ($Fe_3O_4$) powder.

In an embodiment, a heat resistant temperature of the coating film may be from 900° C. to 1000° C.

In an embodiment, a thickness of the coating film may be from 15 μm to 100 μm.

In an embodiment, an average particle size of the coating film may be from 50 nm to 1500 nm.

In an embodiment, the substrate may be formed of aluminum, a steel sheet, titanium, copper, or a stainless-steel alloy.

Another aspect of the present invention to achieve the object provides a method of preparing a high heat-resistant coating film further including: after the step (c), (d') preparing a water-repellent solution by dispersing a silane solution in a diluent; (e) applying the water-repellent solution to at least one surface of the coating film; and (f) drying and curing the water-repellent solution applied coating film to form a water-repellent coating film.

In another embodiment, the water-repellent solution may be prepared by mixing 10 wt % to 30 wt % of the silane solution and 70 wt % to 90 wt % of the diluent.

In another embodiment, the silane solution may include one selected from the group consisting of hexadecyltrimethoxysilane (HDTMS), methyltriethoxysilane (MTES), phenyl triethoxysilane (PhTES), diethoxy(3-glycidyloxypropyl)methylsilane (GPTMS), tetraethylorthosilicate (TEOS), and octal triethoxysilane (OTES).

In another embodiment, the diluent may be distilled water or alcohol.

In another embodiment, the step (e) may be performed by one method selected from the group consisting of brush coating, spin coating, spray coating, and dip coating.

In another embodiment, the step (f) may be performed at a temperature of 80° C. to 150° C. for 0.1 hours to 5 hours.

In another embodiment, the method may further include (g) removing impurities remaining on the surface, after the step (f).

A high heat-resistant coating film including the water-repellent coating film prepared by the method is provided.

In another embodiment, a thickness of the water-repellent coating film may be from 0.5 μm to 3 μm.

BRIEF DESCRIPTION OF THE DRAWINGS

These and/or other aspects will become apparent and more readily appreciated from the following description of the embodiments, taken in conjunction with the accompanying drawings in which:

FIG. 2 shows surfaces of coating films according to an embodiment of the present invention formed on an aluminum alloy (Al) and an iron alloy (Fe) observed after a pencil hardness test;

FIG. 5 shows original plates of an aluminum alloy (Al) and an iron alloy (Fe) before and after a flame test with respect to composition changes according to an embodiment of the present invention;

FIGS. 6 to 10 shows original plates of an aluminum alloy (Al) and an iron alloy (Fe) before and after a flame test with respect to $Fe_3O_4$ content in the same composition according to an embodiment of the present invention;

FIG. 13A shows that corrosion of an iron steel sheet (Fe) is prevented by adding iron (III) oxide ($Fe_3O_4$) to the ceramic filler according to an embodiment of the present invention, and FIG. 13B shows that corrosion of the iron steel sheet (Fe) is prevented by water-repellent coating according to another embodiment of the present invention.

DETAILED DESCRIPTION

Figure 1:
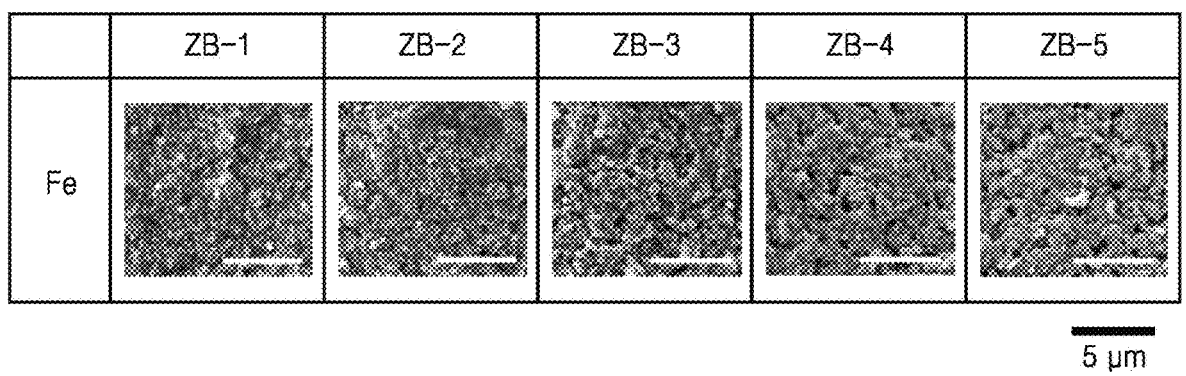
FIG. 1 shows scanning electron microscope (SEM) images of ceramic mixed powders according to an embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein, in connection with one embodiment, may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views and length, area, and thickness in the drawings may be exaggerated for descriptive convenience. Hereinafter, embodiments of the present invention will be described in detail with reference to the accompanying drawings so that these embodiments may be readily implemented by those skilled in the art.

A liquid ceramic filling agent according to an embodiment of the present invention is prepared by dispersing a ceramic filler in an inorganic nanosol.

A composition of the ceramic filing agent may include 10 wt % to 50 wt % of the ceramic filler including iron (III) oxide ($Fe_3O_4$) powder, 10 wt % to 30 wt % of a diluent selected from distilled water and alcohol, and 20 wt % to 80 wt % of the inorganic nanosol.

When a surface of a substrate is coated with a ceramic filler, the substrate generally reacts with an oxidant such as water ($H_2O$) or oxygen and is corroded thereby. Corrosion of the substrate may be prevented by adding iron (III) oxide ($Fe_3O_4$) to the ceramic filler. In addition, by introducing iron (III) oxide ($Fe_3O_4$) filler, the thermal expansion coefficient of the coating film according to temperature can be adjusted similarly to or slightly higher than that of the substrate, thereby improving the adhesion strength between the substrate and the coating film. A content of the iron (III) oxide ($Fe_3O_4$) may be in the range of 20 to 60 wt %, preferably, 30 to 50 wt %, based on a content of the ceramic filler. In addition, the ceramic filler, as a material with high heat resistance and excellent strength, may further include $Al_2O_3$, $ZrO_2$, SiC, $BaTiO_3$, pearl, and any mixture thereof in the form of powder. A particle size of the ceramic powder constituting the ceramic filler may be in the range of 10 to 2500 nm. The ceramic filling agent may be a mixed filler including two or more ceramic filler powders, the diluent, and the inorganic nanosol and prepared by a ball mill process. In the preparation of the ceramic filling agent, the ceramic filler, the diluent, and the inorganic nanosol may be mixed simultaneously. When the ceramic filler is stirred with the inorganic nanosol for a long time, gelation may occur. Thus, gelation may be prevented by adding the inorganic nanosol to a mixed solution of the ceramic filler and the diluent.

An alcohol-based mixed solvent as the diluent may include IPA or n-butanol and include moisture in an amount of 20 wt % or less.

The inorganic nanosol may include silica sol or silica-hybrid sol. The inorganic nanosol may be obtained by adding a solvent to an alkoxysilane. The alkoxysilane may include at least one selected from methyltrimethoxysilane, methyltrichlorosilane, ethyltrimethoxysilane, ethyltriethoxysilane, phenyltrimethoxysilane, phenyltrichlorosilane, phenylaminopropyltrimethoxysilane, octyltrimethoxysilane, octyltrichlorosilane, octadecyltrimethoxysilane, octadecyltrichlorosilane, propyltrimethoxysilane, n-propyltriethoxysilane, isopropyltriethoxysilane, isobutyltrimethoxysilane, vinyltriethyloxysilane, vinyltrimethoxysilane, and allyltrimethoxysilane. The inorganic nanosol may serve as a binder for improving adhesive strength to the substrate by combining the liquid ceramic filling agent.

The liquid ceramic filling agent may be applied to the surface of the substrate and dried for curing to form a high heat-resistant coating film on the surface of the substrate. As a coating method, one or more of brush coating, spin coating, spray coating, and dip coating may be used.

The drying may be performed at a temperature of 20 to 200° C. for 2 to 24 hours. A process of removing impurities remaining on the surface of the substrate may further be performed after the drying process.

The substrate may be any substrate formed of a material requiring heat resistance such as metal, ceramic, and polymer. For example, the metal may include a steel sheet, stainless steel, an aluminum alloy, a titanium alloy, a copper alloy, and the like. The substrate may be previously surface-treated.

The high heat-resistant coating film formed by coating the surface of the substrate may have a thickness of 15 to 100 μm. A heat-resistant temperature of the high heat-resistant coating film may reach up to 1000° C. An average particle size of the high heat-resistant coating film may be from 50 to 1500 nm.

Hereinafter, the present invention will be described in more detail with reference to the following preparation examples and experimental examples of the high heat-resistant coating film. However, the following examples are merely presented to exemplify the present invention, and the scope of the present invention is not limited to the following examples and experimental examples.

<Example 1> Formation of Coating Film Using Liquid Ceramic Composition

Table 1 shows compositions of liquid ceramic filling agents for preparing a high heat-resistant coating film according to an embodiment of the present invention. Materials corresponding to symbols shown in Table 1 are indicated at a lower portion of Table 1. ZB sample was prepared by ball-milling a ceramic filler, a diluent, and an inorganic nanosol, and ZB-1 to ZB-5 samples were prepared by ball-milling a ceramic filler and a diluent and then adding an inorganic nanosol thereto, followed by re-ball milling of the mixture for 6 hours.

Coating films were formed on surfaces of an aluminum alloy (Al) and an iron alloy (Fe) using the filling agents, and thicknesses of the coating films are as follows: Sample 1 (Al: 85 μm, Fe: 63 μm), Sample 2 (Al: 85 μm, Fe: 51 μm), Sample 3 (Al: 33 μm, Fe: 32 μm), Sample 4 (Al: 16 μm, Fe: 15 μm), Sample 5 (Al: 65 μm, Fe: 32 μm), Sample 6 (Al: 30 μm, Fe: 15 μm), and Sample 7 (Al: 38 μm, Fe: 15 μm).

TABLE 1

| Sample | Name | A % | Z % | S % | B % | F % | P % | H % | IPA % | n-butanol % | Specific gravity |
|---|---|---|---|---|---|---|---|---|---|---|---|
| 1 | AZS-1 | 10 | 15.33 | 2.67 | 0 | 3.33 | 2 | 66.67 | 0 | 0 | 1.124 |
| 2 | ZB | 0 | 8.33 | 0 | 8.33 | 16.67 | 0 | 41.67 | 22.92 | 2.08 | 1.158 |
| 3 | ZB-1 | 0 | 16.67 | 0 | 16.67 | 0 | 0 | 41.66 | 22.92 | 2.08 | 1.236 |
| 4 | ZB-2 | 0 | 11.665 | 0 | 11.665 | 10 | 0 | 41.67 | 22.92 | 2.08 | 1.198 |
| 5 | ZB-3 | 0 | 8.33 | 0 | 8.33 | 16.67 | 0 | 41.67 | 22.92 | 2.08 | 1.126 |
| 6 | ZB-4 | 0 | 5 | 0 | 5 | 23.33 | 0 | 41.67 | 22.92 | 2.08 | 1.205 |
| 7 | ZB-5 | 0 | 0 | 0 | 0 | 33.33 | 0 | 41.67 | 22.92 | 2.08 | 1.141 |

A: $Al_2O_3$, Z: $ZrO_2$, S: SiC, B: $BaTiO_3$, F: $Fe_3O_4$, P: Pearl, H: Hybrid sol binder FIG. 1 shows scanning electron microscope (SEM) images of ceramic mixed powders constituting ZB-1 to ZB-5 samples of Table 1. Referring to FIG. 1, it may be confirmed that components Z, B, and F are uniformly dispersed in ZB-2 and ZB-3 samples indicating superior formation of nanocomposite structures. On the contrary, it may be confirmed that the ZB-1 sample has a highly aggregated nanocomposite structure due to a high B content and ZB-4 and ZB-5 samples had coarser particles as the B content decreases and an F content increases. Due to formation of aggregates and coarsening of particles shown in ZB-1, ZB-4, and ZB-5 samples, cracks are increased after high-temperature thermal shock. In this case, an average particle size of the mixed powder is in the range of 50 to 1500 nm.

The compositions of Samples 1 to 7 of Table 1 were prepared by mixing the ceramic filler with the silica-hybrid sol, and stirring the mixture. The ceramic powders constituting each ceramic filler shown in Table 1 were mixed by ball-milling for 24 hours. Then, the mixed ceramic filler was mixed with the silica-hybrid sol and then stirred for 6 hours by ball-milling. Subsequently, the prepared liquid ceramic composition was applied to an aluminum (Al) substrate and an iron steel sheet (Fe) by spray coating and cured to form a ceramic coating film. The curing was performed by drying, for example, at room temperature for 24 hours. Finally, by removing impurities remaining on the surface of the substrate, a high heat-resistant coating film according to the present invention was prepared.

FIG. 2 shows surfaces of coating films according to an embodiment of the present invention formed on an aluminum alloy (Al) and an iron alloy (Fe) observed after a pencil hardness test. Table 2 shows pencil hardness test results of the samples. Flame test results of the AZS-1 and ZB coating films are marked as AZS-1(F) and ZB(F).

In FIG. 2, (a) shows pencil hardness test results of the coating film corresponding to Sample 1 (AZS-1) and (b) shows flame test results of the same coating film. In FIG. 2, (c) shows pencil hardness test results of the coating film corresponding to Sample 2 (ZB) and (d) shows flame test results of the same coating film. Referring to these results, it may be confirmed that peeling off or destruction of the coating film does not occur even after the flame test as before the flame test.

In FIG. 2, (e), (f), and (g) show pencil hardness test results of the filling agent of Sample 5 having the same composition as that of (c). However, the samples are different from each other in that the coating film of (c) of FIG. 2 was prepared by stirring both the ceramic filler and the silica-hybrid sol by ball-milling for 24 hours, the coating film of (e) of FIG. 2 was prepared by stirring the ceramic powder constituting the ceramic filler for 24 hours at room temperature and then mixing the stirred ceramic powder and the silica-hybrid sol, followed by stirring for 6 hours by ball-milling, and the coating films of (f) and (g) of FIG. 2 were prepared by curing at 100° C. and 150° C., respectively, in a drying oven for 3 hours. In FIG. 2 and Table 2, ZB-3 (RT) indicates cured at room temperature for 24 hours, ZB-3(100) indicates cured at 100° C. for 3 hours, and ZB-3(150) indicates cured at 150° C. for 3 hours. Referring to this, it may be confirmed that the coating films were uniformly formed under all conditions.

Table 2 summarizes pencil hardness test results of the same samples as those of FIG. 2.

TABLE 2

| Sample No. # | Substrate | 1D | 7D | 14D | 21D | 28D |
|---|---|---|---|---|---|---|
| AZS-1 | Al | X | 9H | 9H | 9H | 9H |
|  | Fe | X | 5H | 5H | 6H | 7H |
| AZS-1(F) | Al | 9H | 9H | 9H | 9H | 9H |
|  | Fe | 9H | 9H | 9H | 9H | 9H |
| ZB | Al | 8H | 9H | 9H | 9H | 9H |
|  | Fe | 8H | 8H | 8H | 9H | 9H |
| ZB(F) | Al | 8H | 9H | 9H | 9H | 9H |
|  | Fe | 9H | 9H | 9H | 9H | 9H |
| ZB-3(RT) | Al | 9H | 9H | 9H | 9H | 9H |
|  | Fe | 9H | 9H | 9H | 9H | 9H |
| ZB-3(100) | Al | 9H | 9H | 9H | 9H | 9H |
|  | Fe | 8H | 9H | 9H | 9H | 9H |
| ZB-3(150) | Al | 9H | 9H | 9H | 9H | 9H |
|  | Fe | 9H | 9H | 9H | 9H | 9H |

Referring to Table 2, although the iron steel sheet (Fe) of the ZB sample exhibits a pencil hardness of 8H until day 14, the iron steel sheet (Fe) of the ZB-3 (RT) sample according to the present invention exhibits a pencil hardness of 9H from day 1. This difference is based on the ball-milling process. While the ZB sample was prepared by simultaneously stirring the ceramic filler and the inorganic nanosol for 24 hours by ball-milling, the ZB-3 sample of the present invention was prepared by stirring the ceramic filler for 24 hours by ball-milling first and then mixing the ceramic filler with the inorganic nanosol, followed by stirring for 6 hours by ball-milling. Gelation of the inorganic nanosol deteriorated physical properties of the iron steel sheet (Fe) of the ZB sample. In order to prevent this phenomenon, the stirring time of the inorganic nanosol was reduced to 6 hours in the ZB-3 sample of the present invention to prevent gelation.

Figure 3:
FIG. 3 shows 2× manified photographs of indentations formed on the same samples as those of FIG. 2 after a hardness test using a Leeb hardness tester.

FIG. 3 shows 2× manified photographs of indentations formed on samples shown in Table 3 after a hardness test using a Leeb hardness tester. Leeb hardness test measures a hardness of a coating film on a substrate as a value obtained by dividing a rebounding velocity by an impact velocity $$\left(\frac{\text{Rebound velocity}}{\text{Impact velocity}} \times 1000\right)$$

and a higher value Impact velocity indicates a higher hardness. Fe substrates (steel sheet) having high hardness were measured by Vickers hardness (Hv), and Al substrates having low hardness were measured by Brinell hardness (HB). In Tables 2 and 3, D means curing time (Day) and in Table 3, (RT) indicates cured at room temperature, 100 indicates cured at 100° C. for 3 hours, and 150 indicates cured at 150° C. for 3 hours. In the ZB-1 sample, in the case of the Fe (steel sheet) substrate, a hardness increased as the curing temperature and the curing time increased, i.e., a higher hardness was obtained by curing at 100° C. or 150° C. compared to room temperature and by curing for 21 days.

Figure 4A:
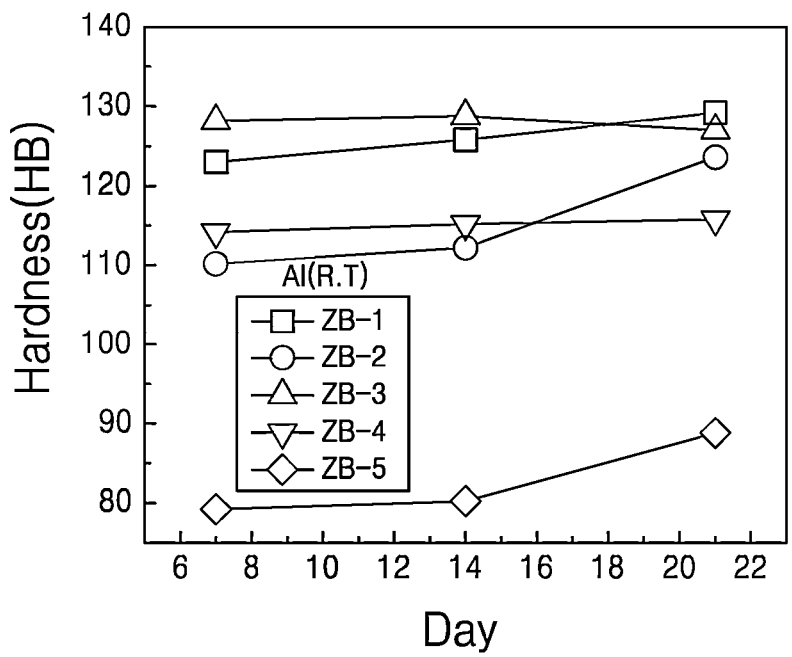
FIG. 4A to FIG. 4F show Leeb hardness of samples according to an embodiment of the present invention, with respect to curing temperature and curing time.
Figure 4B:
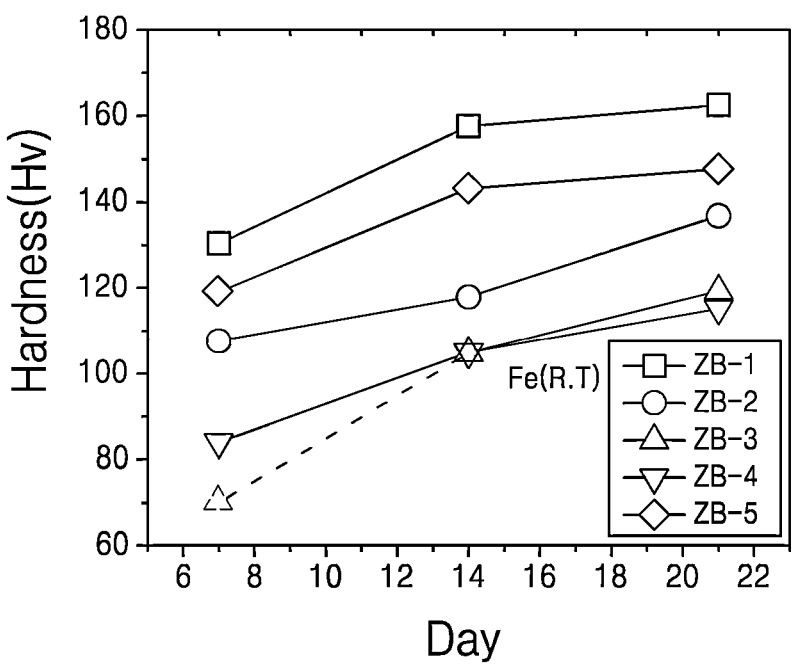
Figure 4C:
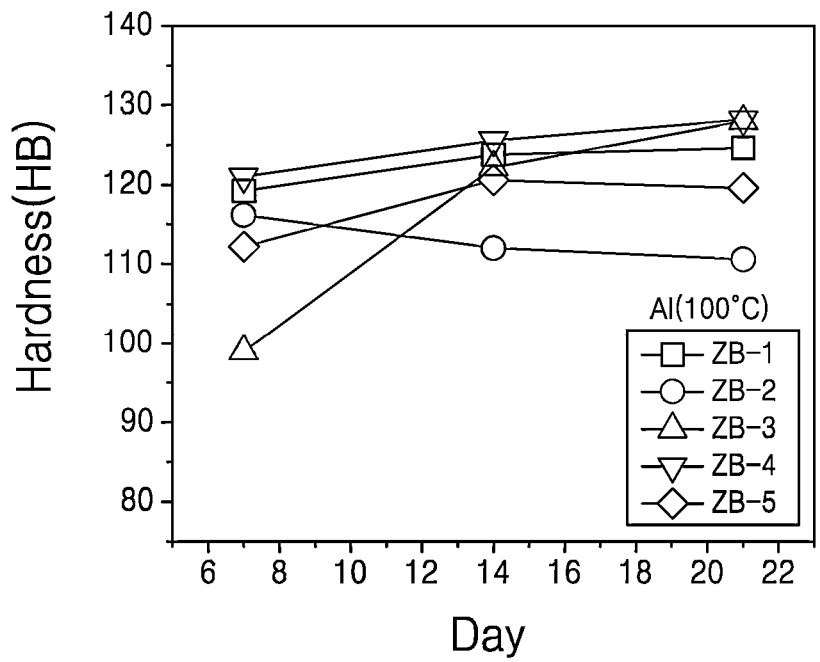
Figure 4D:
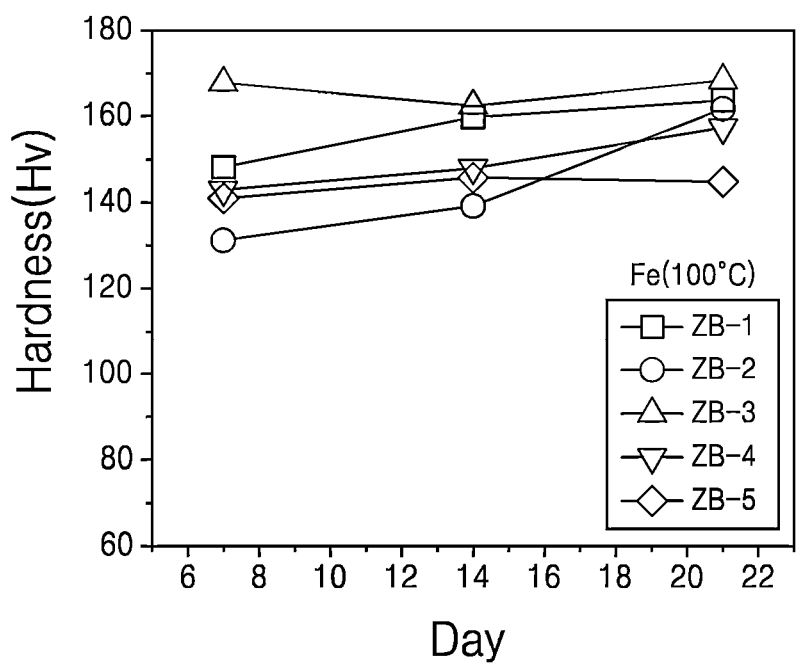
Figure 4E:
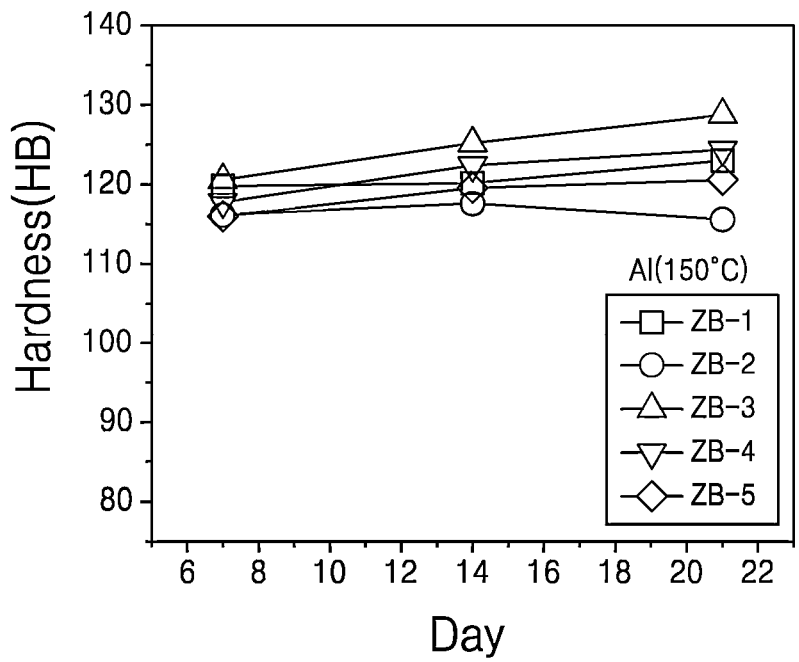
Figure 4F:
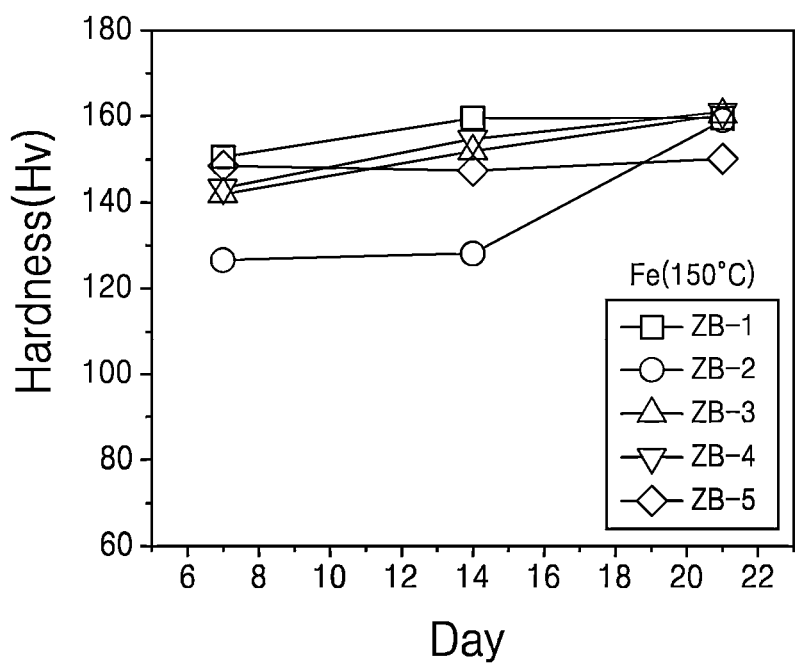

FIG. 4A to FIG. 4F show Leeb hardness of samples according to an embodiment of the present invention, i.e., ZB-1 to ZB-5 samples, with respect to curing temperature and curing time. FIG. 4A shows HB hardness of Al substrates at room temperature, FIG. 4B shows Hv hardness of Fe substrates at room temperature, FIG. 4C shows HB hardness of Al substrates at 100° C., FIG. 4D shows Hv hardness of Fe substrates at 100° C., FIG. 4E shows HB hardness of Al substrates at 150° C., and FIG. 4F shows Hv hardness of Fe substrates at 150° C.

TABLE 3

|  |  | 7D | 14D | 21D |
|---|---|---|---|---|
| AZS-1 | Al(HB) |  | 124.6 | 144.8 |
|  | Fe(Hv) |  | 116.4 | 115.2 |
| AZS-1(F) | Al(HB) | 82.8 | 98.4 | 100.8 |
|  | Fe(Hv) | 97.6 | 98.6 | 105.6 |
| ZB | Al(HB) |  | 128.2 | 133.4 |
|  | Fe(Hv) |  | 111.4 | 151.8 |
| ZB(F) | Al(HB) | 85 | 83 | 88.6 |
|  | Fe(Hv) | 128 | 125.8 | 125.2 |
| ZB-1(RT) | Al(HB) | 123 | 125.8 | 129.2 |
|  | Fe(Hv) | 130.4 | 157.6 | 162.6 |
| ZB-1(100) | Al(HB) | 119.2 | 123.8 | 124.6 |
|  | Fe(Hv) | 148.2 | 159.8 | 163.8 |
| ZB-1(150) | Al(HB) | 119.8 | 120.2 | 123 |
|  | Fe(Hv) | 150.6 | 159.6 | 159.6 |
| ZB-2(RT) | Al(HB) | 110.2 | 112.2 | 123.6 |
|  | Fe(Hv) | 107.6 | 118 | 136.8 |
| ZB-2(100) | Al(HB) | 116.2 | 112 | 110.6 |
|  | Fe(Hv) | 131.2 | 139.2 | 161.8 |
| ZB-2(150) | Al(HB) | 116.2 | 117.6 | 115.6 |
|  | Fe(Hv) | 126.6 | 128.2 | 159 |
| ZB-3(RT) | Al(HB) | 128.2 | 128.8 | 127 |
|  | Fe(Hv) | <80 | 104.8 | 119.4 |
| ZB-3(100) | Al(HB) | 99 | 122.2 | 128 |
|  | Fe(Hv) | 167.8 | 162.4 | 168.4 |
| ZB-3(150) | Al(HB) | 120.6 | 125.2 | 128.8 |
|  | Fe(Hv) | 142 | 152 | 160.4 |
| ZB-4(RT) | Al(HB) | 114.2 | 115.2 | 115.8 |
|  | Fe(Hv) | 84 | 105 | 115.2 |
| ZB-4(100) | Al(HB) | 121 | 125.6 | 128.2 |
|  | Fe(Hv) | 143 | 148 | 157.4 |
| ZB-4(150) | Al(HB) | 117.8 | 122.4 | 124.4 |
|  | Fe(Hv) | 143.4 | 154.8 | 161 |
| ZB-5(RT) | Al(HB) | 79.2 | 80.8 | 88.8 |
|  | Fe(Hv) | 119.2 | 143.2 | 147.6 |
| ZB-5(100) | Al(HB) | 112.2 | 120.6 | 119.6 |
|  | Fe(Hv) | 141 | 145.8 | 144.8 |
| ZB-5(150) | Al(HB) | 116 | 119.6 | 120.6 |
|  | Fe(Hv) | 148.6 | 147.4 | 150.2 |

FIG. 5 shows original plates of an aluminum alloy (Al) and an iron alloy (Fe) before and after a flame test with respect to composition changes according to an embodiment of the present invention.

In FIG. 5, (a) shows photographs of the original plates, i.e., substrates, of the aluminum alloy (Al) and the iron alloy (Fe) before and after the flame test. In the case of Al, the original plate began to melt after a 600° C. flame test and destructed thereafter. In the case of Fe, cracks occurred after a 950° C. flame test. On the contrary, referring to (c) of FIG. 5, the Al and Fe plates having the ceramic coating films did not show melting or cracks. Also, peeling-off of the coating films was not observed.

Table 4 summarizes cross-cut test results of the same samples as shown in FIG. 4A to FIG. 4F. According to an adhesive strength test, an area of a coating film remaining on a tape is expressed in % after the tape is attached to the coating film and then peeled off. Criteria for classification, which are criteria for evaluation of the adhesive strength, are shown at a lower portion of Table 4. Adhesive strength between a coating film and a substrate is classified into 0 to 5 levels as described below based on an amount of the coating film removed after a tape is attached to the surface of the coating film cut by a knife and then peeled off. In this regard, 0: 0% removal, 1: less than 5% removal, 2: 5-15% removal, 3: 15-35% removal, 4: 35-65% removal, and 5: 65% or more removal indicating that a lower number indicates a higher adhesive strength. Based on the test results, AZS-1(Al) and ZB(Al) samples belong to level 3, and ZB-3(Al) samples belong to level 2 regardless of curing temperature indicating excellent adhesive strength.

TABLE 4

|  |  | % of Area Removed | Classification |
|---|---|---|---|
| AZS-1 | Al | 17.5(±0.168) | 3 |
|  | Fe | 15.7(±0.415) | 3 |
| ZB | Al | 19.8(±0.553) | 3 |
|  | Fe | 12.0(±0.090) | 2 |
| ZB-3(RT) | Al | 12.7(±0.753) | 2 |
|  | Fe | 11.8(±0.146) | 2 |
| ZB-3(100) | Al | 5.4(±0.180) | 2 |
|  | Fe | 15.8(±0.154) | 3 |
| ZB-3(150) | Al | 6.6(±0.154) | 2 |
|  | Fe | 16.9(±1.152) | 3 |

(0: 0% removal, 1: less than 5% removal, 2: 5-15% removal, 3: 15-35% removal, 4: 35-65% removal, and 5: 65% or more removal)

Referring to Table 4, it may be confirmed that all samples had excellent adhesive strengths of levels 2 and 3.

FIGS. 6 to 10 shows original plates of an aluminum alloy (Al) and an iron alloy (Fe) before and after a flame test with respect to $Fe_3O_4$ content in the same composition according to an embodiment of the present invention.

Figure 6:
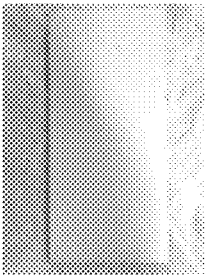

Based on the content of the liquid-ceramic filling agent, the $Fe_3O_4$ content of the ZB-1 sample was 0 wt % in FIG. 6, the $Fe_3O_4$ content of the ZB-2 sample was 10 wt % in FIG. 7, the $Fe_3O_4$ content of the ZB-3 sample was 16.67 wt % in FIG. 8, the $Fe_3O_4$ content of the ZB-4 sample was 23.33 wt % in FIG. 9, and the $Fe_3O_4$ content of the ZB-5 sample was 33.33 wt % in FIG. 10. Based on the content of the ceramic filler, the $Fe_3O_4$ contents were 0, 30, 50, 70, and 100 wt % respectively. Here, only the $Fe_3O_4$ content was varied and the contents of the other materials were the same. A composition of the $Fe_3O_4$ content may be in the range of 20 to 60 wt %, preferably 50 wt %, based on the content of the ceramic filler. This indicates that the $Fe_3O_4$ contents are in the range of 6.67 to 20 wt % based on the total wt % of the liquid ceramic filling agent.

Table 5 summarizes flame test results of the same samples as those in FIGS. 6 to 10 with respect to the content of the $Fe_3O_4$ filler. In the ZB-1 or ZB-5 sample, the iron steel sheet (Fe) was peeled off and cracks occurred thereon, and the ZB-3 sample of the present invention exhibited excellent high heat-resistant on the aluminum alloy (Al) or the iron steel sheet (Fe).

TABLE 5

| Sample | Name | Al (600° C.) | Fe (950° C.) |
|---|---|---|---|
| 3 | ZB-1(RT) | ○ | X |
| 3 | ZB-1(100) | ○ | X |
| 3 | ZB-1(150) | ○ | X |
| 4 | ZB-2(RT) | ○ | ○ |
| 4 | ZB-2(100) | ○ | ○ |
| 4 | ZB-2(150) | ○ | ○ |
| 5 | ZB-3(RT) | ○ | ○ |
| 5 | ZB-3(100) | ○ | ○ |
| 5 | ZB-3(150) | ○ | ○ |
| 6 | ZB-4(RT) | X | Δ |
| 6 | ZB-4(100) | X | Δ |
| 6 | ZB-4(150) | X | Δ |
| 7 | ZB-5(RT) | ○ | X |
| 7 | ZB-5(100) | ○ | X |
| 7 | ZB-5(150) | X | X |

○: Good
Δ: Mostly good
X: Melting, oxidation, cracks, and destruction

Figure 11A:
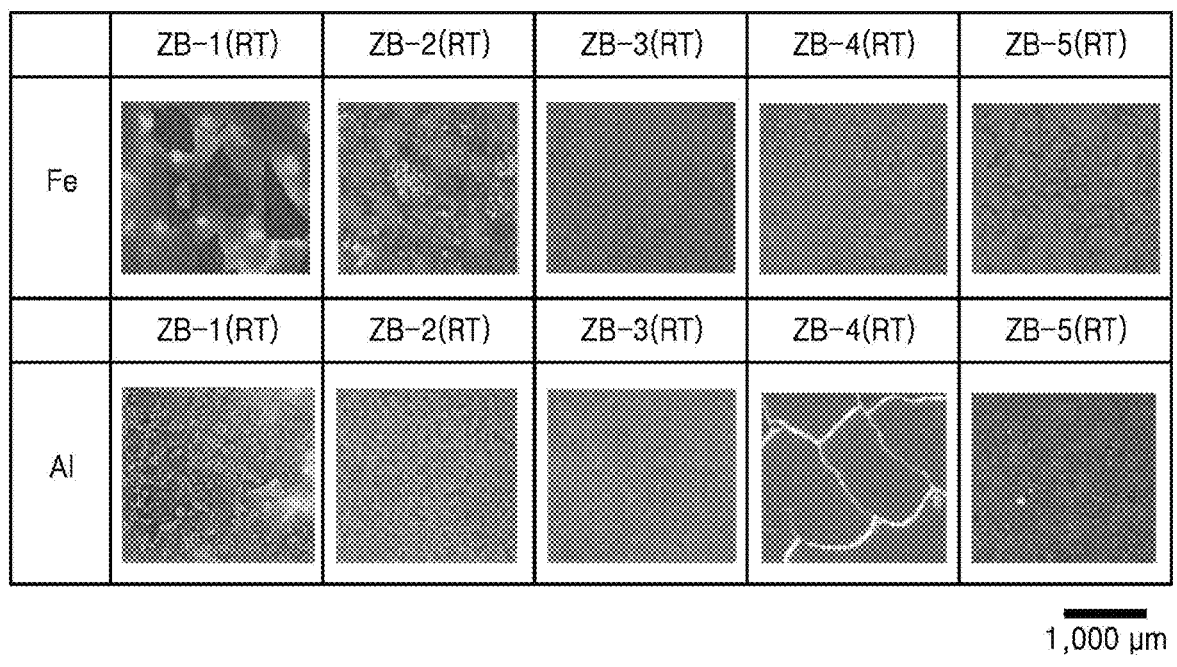
FIG. 11A shows surfaces of original plates of an aluminum alloy (Al) and an iron alloy (Fe) with respect to the $Fe_3O_4$ content after a heat resistance test according to an embodiment of the present invention.
Figure 11B:
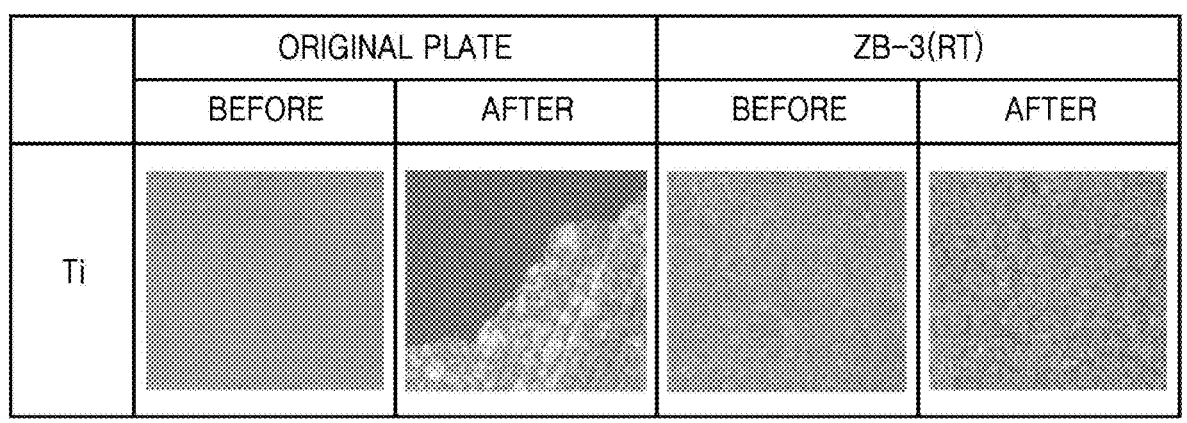
FIG. 11B shows an original plate of a titanium alloy (Ti) and a Ti plate including $Fe_3O_4$ before and after a heat resistance test according to an embodiment of the present invention.

FIG. 11A shows surfaces of original plates of an aluminum alloy (Al) and an iron alloy (Fe) with respect to the $Fe_3O_4$ content after a heat resistance test according to an embodiment of the present invention, and FIG. 11B shows an original plate of a titanium alloy (Ti) and a Ti plate including $Fe_3O_4$ before and after a heat resistance test according to an embodiment of the present invention.

Referring to FIG. 11A, while the iron steel sheet (Fe) and the aluminum alloy (Al) were peeled off or cracks occurred thereon in the ZB-1, ZB-4, and ZB-5 samples, the ZB-2 and ZB-3 samples, more preferably, the ZB-3 sample of the present invention, exhibited excellent high heat-resistant in the iron steel sheet (Fe) and aluminum alloy (Al). Similarly, referring to FIG. 11B, it was confirmed that the ZB-3 sample of the present invention exhibited excellent high heat-resistant in the titanium alloy (Ti) substrate in comparison with the original plate of Ti where cracks occurred.

Figure 12:
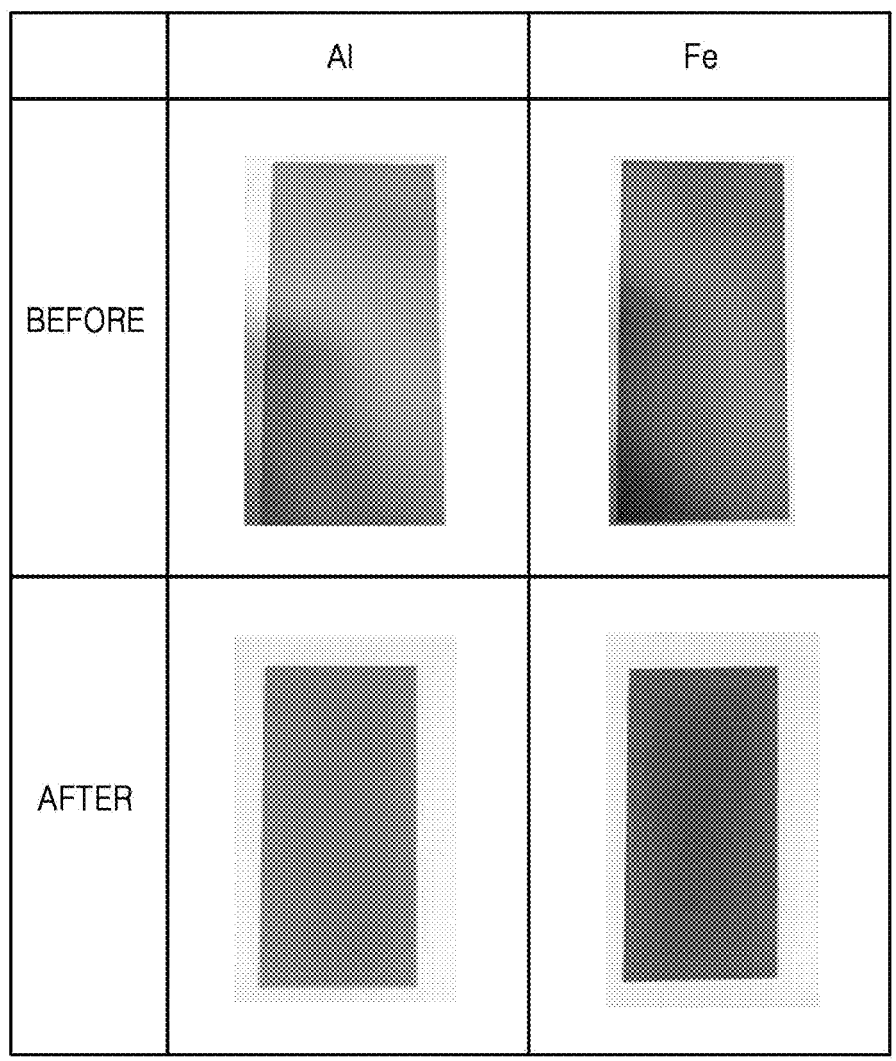
FIG. 12 shows an aluminum alloy (Al) and an iron steel sheet (Fe) coated only with an inorganic nanosol.

FIG. 12 shows an aluminum alloy (Al) and an iron steel sheet (Fe) coated only with an inorganic nanosol.

In FIG. 12, corrosion occurred in the iron steel sheet (Fe) coated only with the inorganic nanosol. The iron steel sheet (Fe) generally reacts with an oxidant such as water ($H_2O$) or oxygen as shown in the following formulae and is corroded thereby.

$Fe \rightarrow Fe^{2+} + 2e^-$ $Fe^{2+} \rightarrow 3Fe^{3+} + e^-$

When a pigment $Fe_3O_4$ is added thereto in order to prevent the corrosion, an antioxidant reaction that adjust an $Fe^{2+}/Fe^{3+}$ ratio by redox potential occurs. OH-generated by hydrolysis of water and oxygen is combined with $Fe_3O_4$ to generate FeOOH.

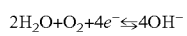

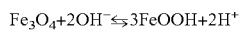

The corrosion may be prevented via condensation between FeOOH generated by the above-described reaction and Silanol.

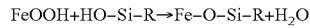

Also, heat-resistant oxides may form a grafting bond (M-O-Si) during the curing process to improve adhesive strength with the substrate. Via the reaction, a browning phenomenon that occurs in steel sheets to which $Fe_3O_4$ is not added may be prevented by adding $Fe_3O_4$.

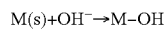

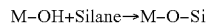

FIG. 13A shows that corrosion of an iron steel sheet (Fe) is prevented by adding iron (III) oxide ($Fe_3O_4$) to the ceramic filler according to an embodiment of the present invention, and FIG. 13B shows that corrosion of the iron steel sheet (Fe) is prevented by water-repellent coating according to another embodiment of the present invention.

Referring to FIG. 13A, while corrosion was observed in the iron steel sheet (Fe) coated only with the inorganic nanosol without $Fe_3O_4$ and the ZB-1 sample at 600× magnification obtained using an electron microscope (I-CAM-SCOPE), ZB-2, ZB-3, ZB-4, and ZB-5 samples to which $Fe_3O$ was added exhibited far less corrosion. Particularly, the ZB-3 sample of the present invention had a particularly smooth surface with almost no corrosion and, referring to FIG. 13B, no corrosion was observed in the ZB-3 sample further including a water-repellent coating film formed according to another embodiment of the present invention which will be described below.

<Example 2> Formation of Additional Water-Repellent Coating Film Using Water-Repellent Solution A method of forming a high heat-resistant coating film according to another embodiment of the present invention may further include a process of forming a water-repellent coating film on the cured ceramic coating film using a water-repellent solution after the above-described curing processing of the method of forming the high heat-resistant coating film according to the previous embodiment as described above.

The above-described water-repellent solution may further include at least one silane solution selected from the group consisting of hexadecyltrimethoxysilane (HDTMS), methyltriethoxysilane (MTES), phenyl triethoxysilane (PhTES), diethoxy(3-glycidyloxypropyl)methylsilane (GPTMS), tetraethylorthosilicate (TEOS), and octal triethoxysilane (OTES).

The water-repellent solution may be prepared by dispersing the above-described silane solution in distilled water and alcohol. More specifically, the composition of the water-repellent solution may include 10 to 30 wt % of a solution of tetraethyl orthosilicate (TEOS), hexadecyl trimethoxysilane (HDTMS), and 3-glycidyloxypropyl methoxysilane (GPTMS) and 70 to 90 wt % of a diluent selected from distilled water or alcohol, for example, may be prepared by mixing tetraethyl orthosilicate (TEOS), hexadecyl trimethoxysilane (HDTMS), and 3-glycidyloxypropyl methoxysilane (GPTMS) in an alcohol, followed by dispersion by stirring the mixture at room temperature (25° C.) for 14 hours.

Thereafter, the above-described water-repellent solution was applied to the coating film prepared according to the previous embodiment of the present invention, and dried, for curing to form a water-repellent coating film. The water-repellent solution may be applied thereto by one or more methods selected from the group consisting of brush coating, spin coating, spray coating, and dip coating. The above-described water-repellent coating film may have a thickness of, for example 0.5 to 3 µm.

The curing was performed by drying the film at a temperature of 80° C. to 150° C. for 0.1 hours to 5 hours, preferably, at a temperature of 100° C. to 120° C. for 0.5 hours to 3 hours.

Finally, by removing impurities remaining on the substrate, the high heat-resistant coating film according to another embodiment of the present invention may be prepared.

Experimental Example

Table 6 summarizes acid resistance/wetproof/salt resistance test results of the high heat-resistant coating film according to another embodiment of the present invention on a substrate including an aluminum alloy (Al), an iron steel sheet (Fe), or a titanium alloy (Ti). Each of the ZB-3 samples shown in Table 6 was prepared by further performing a water-repellent coating process according to the method of forming a high heat-resistant coating film according to another embodiment of the present invention on the ZB-3 sample according to the previous embodiment of the present invention. In addition, ZB-3(RT) means cured at room temperature, ZB-3(100) means cured at 100° C. for 3 hours, and ZB-3(150) means cured at 150° C. for 3 hours.

The oxidation resistance test of the high heat-resistant coating film according to another embodiment of the present invention was performed by immersing the high heat-resistant coating film in 5% sulfuric acid ($H_2SO_4$) for 24 hours.

The heat resistance/waterproof test of the high heat-resistant coating film according to another embodiment of the present invention was performed under 85° C./85% RH conditions for 100 hours in a constant temperature/humidity oven.

The salt water test of the high heat-resistant coating film according to another embodiment of the present invention was performed by immersing the high heat-resistant coating film in 5% NaCl for 100 hours.

As shown in Table 6, it was confirmed that the high heat-resistant coating film according to another embodiment of the present invention had excellent acid resistance/waterproofness/salt resistance under all temperature conditions of the tests.

TABLE 6

| Sample | | 5% $H_2SO_4$ (24 hr) | 5% NaCl (100 hr) | 85° C./85% RH (100 hr) |
|---|---|---|---|---|
| ZB-3(RT) | Al | ○ | ○ | ○ |
| Hydrophobic coating | Fe | ○ | ○ | ○ |
|  | Ti | ○ | ○ | ○ |
| ZB-3(100) | Al | ○ | ○ | ○ |
| Hydrophobic coating | Fe | ○ | ○ | ○ |
| ZB-3(150) | Al | ○ | ○ | ○ |
| Hydrophobic coating | Fe | ○ | ○ | ○ |

○: Good

When the high heat-resistant coating film prepared according to an embodiment of the present invention as described above is used, high heat-resistant/oxidation-resistant/flame retardant-non-flammable coating films may be economically formed on various large-area substrates without a high-temperature firing process. In addition, the coating films may be easily formed by using a spray or a brush and effects of reducing inconvenience and working hours therefor may be obtained.

According to the embodiments of the present invention as described above, flexible nanostructured film connected in three dimensions having various sizes may be formed on surfaces of stents formed of various materials by a bottom-up method using the ionic surfactant and the auxiliary spacer under chemically mild conditions.

What is claimed is:

1. A method of forming a high heat-resistant coating film, the method comprising:
   (a) preparing a liquid ceramic filling agent by mixing a ceramic filler including iron (III) oxide ($Fe_3O_4$) powder, a diluent, and an inorganic nanosol;
   (b) applying the liquid ceramic filling agent to at least one surface of a substrate; and
   (c) drying and curing the substrate to form a coating film wherein the liquid ceramic filling agent is prepared by mixing 10 wt % to 50 wt % of the ceramic filler, 10 wt % to 30 wt % of the diluent, and 20 wt % to 80 wt % of the inorganic nanosol.

2. The method of claim 1, wherein a content of the iron (III) oxide ($Fe_3O_4$) is from 20 wt % to 60 wt % based on a content of the ceramic filler.

3. The method of claim 2, wherein the content of the iron (III) oxide ($Fe_3O_4$) is from 30 wt % to 50 wt % based on the content of the ceramic filler.

4. The method of claim 1, wherein the step (a) is performed by simultaneously mixing the ceramic filler, the diluent, and the inorganic nanosol or by adding the inorganic nanosol to a mixed solution of the ceramic filler and the diluent, followed by mixing.

5. The method of claim 1, wherein the ceramic filler comprises one selected from the group consisting of barium titanate ($BaTiO_3$), alumina ($Al_2O_3$), zirconia ($ZrO_2$), silicon carbide (SiC), pearl, and any mixture thereof in the form of powder.

6. The method of claim 1, wherein the ceramic filler has a particle size of 10 nm to 2500 nm.

7. The method of claim 1, wherein the liquid ceramic filling agent is mixed by a ball mill process.

8. The method of claim 1, wherein the diluent is distilled water or alcohol.

9. The method of claim 8, wherein the alcohol is isopropanol (IPA) or n-butanol.

10. The method of claim 1, wherein the inorganic nanosol is silica sol or silica-hybrid sol.

11. The method of claim 1, wherein the step (b) is performed by one method selected from the group consisting of brush coating, spin coating, spray coating, and dip coating.

12. The method of claim 1, wherein the inorganic nanosol is obtained by adding a solvent to an alkoxysilane and stirring the mixture, and the alkoxysilane is one selected from the group consisting of methyltrimethoxysilane, methyltrichlorosilane, ethyltrimethoxysilane, ethyltriethoxysilane, phenyltrimethoxysilane, phenyltrichlorosilane, phenylaminopropyltrimethoxysilane, octyltrimethoxysilane, octyltrichlorosilane, octadecyltrimethoxysilane, octadecyltrichlorosilane, propyltrimethoxysilane, n-propyltriethoxysilane, isopropyltriethoxysilane, isobutyltrimethoxysilane, vinyltriethyloxysilane, vinyltrimethoxysilane, and allyltrimethoxysilane.

13. The method of claim 1, wherein the step (c) is performed at a temperature of 20° C. to 200° C. for 2 hours to 24 hours.

14. The method of claim 1, further comprising removing impurities remaining on the surface of the substrate after the step (c).

15. The method of claim 1, wherein the substrate is formed of aluminum, a steel sheet, titanium, copper, or a stainless-steel alloy.

16. The method of claim 1, further comprising surface-treating the substrate before the step (b).

17. A method of forming a high heat-resistant coating film, the method comprising:
- (a) preparing a liquid ceramic filling agent by mixing a ceramic filler including iron (III) oxide ($Fe_3O_4$) powder, a diluent, and an inorganic nanosol;
- (b) applying the liquid ceramic filling agent to at least one surface of a substrate; and
- (c) drying and curing the substrate to form a coating film; further comprising, after the step (c):
  - (d') preparing a water-repellent solution by dispersing a silane solution in a diluent;
  - (e) applying the water-repellent solution to at least one surface of the coating film; and
  - (f) drying and curing the water-repellent solution applied coating film to form a water-repellent coating film.

18. The method of claim 17, wherein the water-repellent solution is prepared by mixing 10 wt % to 30 wt % of the silane solution and 70 wt % to 90 wt % of the diluent.

19. The method of claim 17, wherein the silane solution comprises one selected from the group consisting of hexadecyltrimethoxysilane (HDTMS), methyltriethoxysilane (MTES), phenyl triethoxysilane (PhTES), diethoxy(3-glycidyloxypropyl)methylsilane (GPTMS), tetraethylorthosilicate (TEOS), and octal triethoxysilane (OTES).

20. The method of claim 17, wherein the diluent is distilled water or alcohol.

21. The method of claim 17, wherein the step (e) is performed by one method selected from the group consisting of brush coating, spin coating, spray coating, and dip coating.

22. The method of claim 17, wherein the step (f) is performed at a temperature of 80° C. to 150° C. for 0.1 hours to 5 hours.

23. The method of claim 17, further comprising (g) removing impurities remaining on the surface, after the step (f).

24. A high heat-resistant coating film prepared by the method according to claim 1,
wherein the high heat-resistant coating film is formed on at least one surface of a substrate and comprises iron (Ill) oxide ($Fe_3O_4$) powder.

25. The high heat-resistant coating film of claim 24, wherein a heat resistant temperature of the coating film is from 900° C. to 1000° C.

26. The high heat-resistant coating film of claim 24, wherein a thickness of the coating film is from 15 μm to 100 μm.

27. The high heat-resistant coating film of claim 24, wherein an average particle size of the coating film is from 50 nm to 1500 nm.

28. The high heat-resistant coating film of claim 24, wherein the substrate is formed of aluminum, a steel sheet, titanium, copper, or a stainless-steel alloy.

29. A high heat-resistant coating film comprising the water-repellent coating film prepared by the method according to claim 17.

30. The high heat-resistant coating film of claim 29, wherein a thickness of the water-repellent coating film is from 0.5 μm to 3 μm.

\* \* \* \* \*